April 17, 1928.
M. OKOCHI ET AL
1,666,343
METHOD OF MANUFACTURING PISTON RINGS
Filed May 4, 1926  3 Sheets-Sheet 1
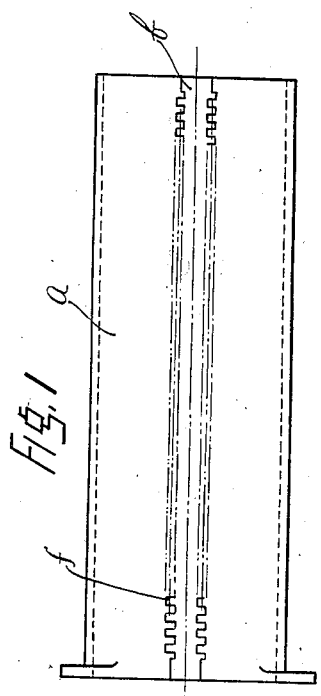
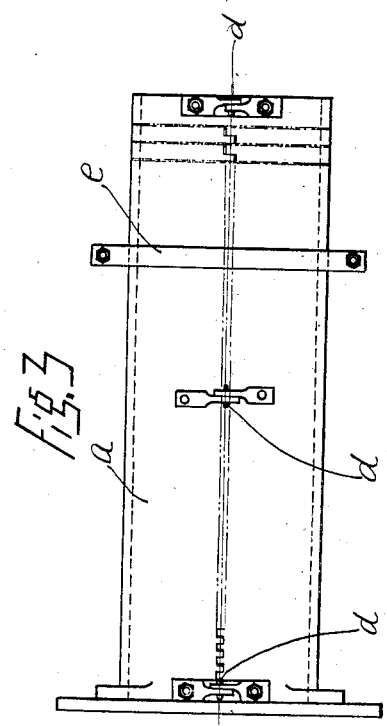
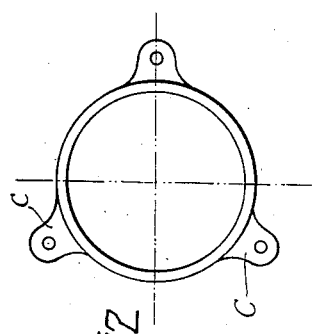
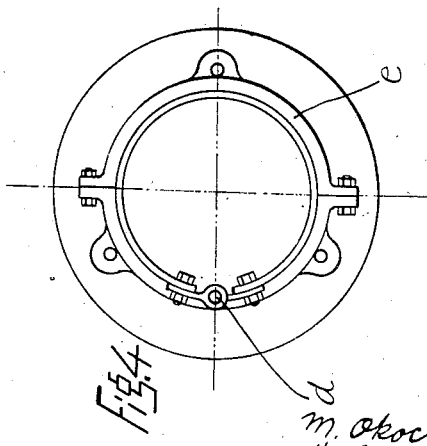
M. Okochi and
K. Ebihara
INVENTORS
By: Marks & Clerk
ATTYS.

April 17, 1928. 1,666,343
M. OKOCHI ET AL
METHOD OF MANUFACTURING PISTON RINGS
Filed May 4, 1926 3 Sheets-Sheet 2
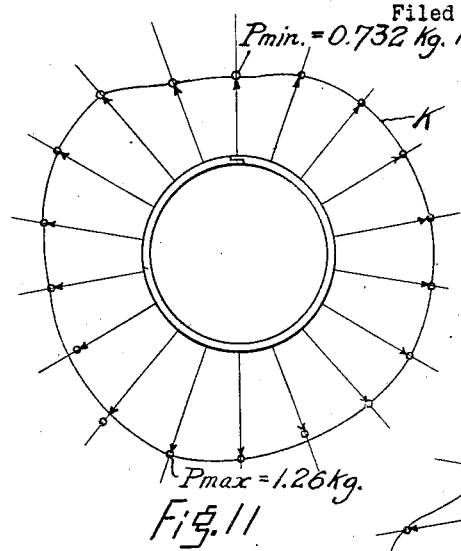
Fig. 11
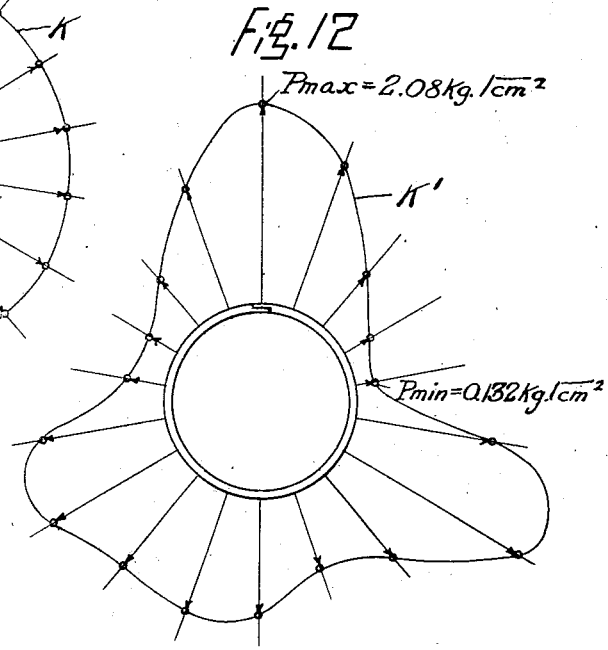
Fig. 12
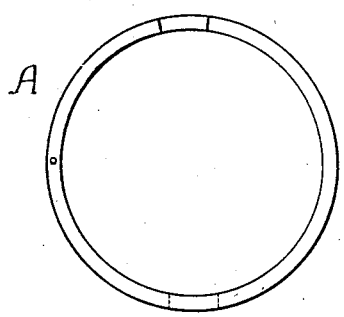
Fig. 6
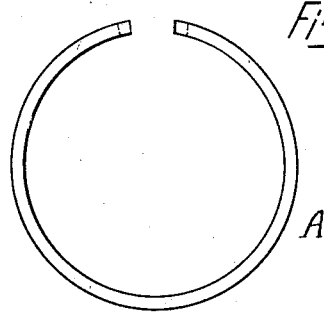
Fig. 5
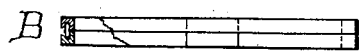
Inventor:
M. Okochi & K. Ebihara
By Attorneys:
Marks & Clerk April 17, 1928.   1,666,343
M. OKOCHI ET AL
METHOD OF MANUFACTURING PISTON RINGS
Filed May 4, 1926   3 Sheets-Sheet 3
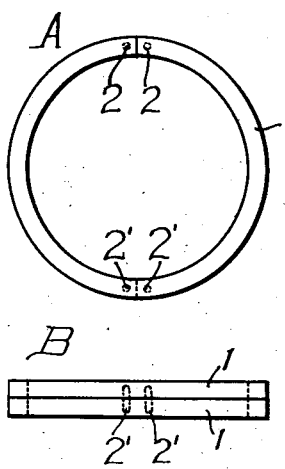
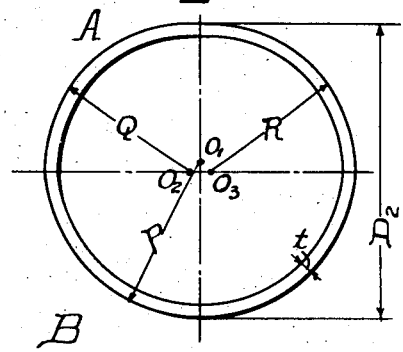
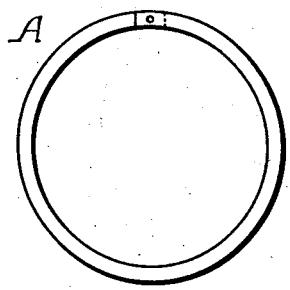
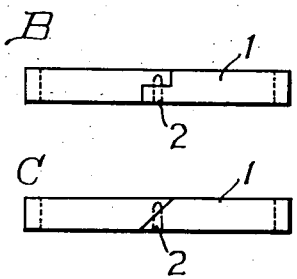
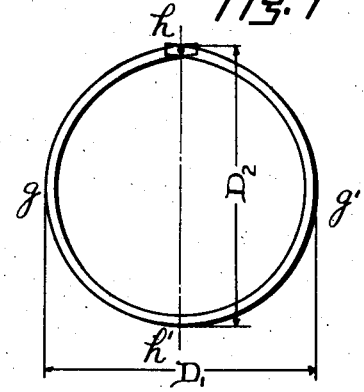
Inventors:
M. Okochi & K. Ebihara
By Attorneys:
Marks & Clerk Patented Apr. 17, 1928.

1,666,343

UNITED STATES PATENT OFFICE.

MASATOSI OKOCHI AND KEIKICHI EBIHARA, OF TOKYO, JAPAN, ASSIGNORS TO ZAIDAN HOJIN RIKAGOKU KENKYUJO, OF TOKYO, JAPAN.

METHOD OF MANUFACTURING PISTON RINGS.

Application filed May 4, 1926, Serial No. 106,721, and in Japan May 16, 1925.

This invention relates to a method of manufacturing piston rings exerting equally distributed pressure against the wall of the engine cylinders. The object of the invention is to manufacture such piston rings in a simple and easy manner.

The drawings illustrate how the invention is to be worked, and in which Fig. 1 shows a cylindrical blank having a longitudinal opening to be employed in this method; Fig. 2 shows an end view thereof; Fig. 3 shows the cylindrical blank when it is closed by pin joints; Fig. 4 shows an end view thereof; Fig. 5 shows a finished ring in which A is the plan, B the elevation; Fig. 6 shows another example of a finished ring, in which A is the plan, B the elevation; and Figs. 7 to 9 illustrate a manner of working of a modified method of the invention, and in which Fig. 7 shows a plan view of a blank closed by a pin joint, Fig. 8 shows a modified form of the cylindrical blank, in which A is a plan view, B the elevation; Fig. 9 shows a ring provided with a modified form of pin joints, in which A is the plan, B the elevation and C the side view of a further modification; Fig. 10 is a third modification of the ring according to the new method and A is the plan, B the elevation; Fig. 11 shows a pressure distributing curve of a piston ring according to the new method acting up on the inner wall of an engine cylinder; while Fig. 12 shows the curve of same nature of the piston ring manufactured by an usual method.

In Fig. 1, $a$ is a cylindrical blank from which piston rings are manufactured according to this invention. $b$ is a longitudinal opening of the blank, the side walls of which are zigzag formed, the opening being made parallel to the longitudinal axis of the blank. $c$, $c$ are flanges of the blank to fit the blank to a lathe or a turning machine.

In Fig. 3, the opening $b$ of the cylindrical blank is closed. $d$, $d$ are pin joints to close the opening. $e$ is a strap to keep the blank closed when it is cut apart into individual rings after the turning operation is finished.

In the operation, the outer diameter of the cylindrical blank is so chosen that it is somewhat greater than the diameter of the inner wall of engine cylinder for which the ring is to be used. Then the opening $b$ is formed and in which the zigzag wall is so arranged that the recesses in one side face to the projection of the other side, so that when closed by means of the pin joints, they can interfit each other to make a completely closed cylindrical blank. Here, the outer wall of the cylindrical blank is turned by a turning machine and finally finished up to a true cylindrical wall the diameter of which is equal to that of the inner wall of the engine cylinder. Before finishing, one of the flanges $c$, adjacent the opening $b$ is released or disconnected from the head stock so that the portions of the cylinder adjacent the opening may be drawn together and held by the pin joints $d$. Then the clamping strap $e$ is applied and the cylinder is cut transversely at uniform intervals to provide a plurality of individual rings. Both sides of these individual rings are then polished by a grinder to finish the whole operation.

Here, the form of the longitudinal opening of the blank is by no means the essential of the invention and therefore it may be replaced by a mere longitudinal cutting of practically parallel walls which, when the opening is closed, tightly abut against each other. Also, the form of the pin joint is by no means the essential of the invention and therefore, so far as the nature of the pin joint is kept, they may be modified to a convenient type, for instance, as shown in Figs. 7, 9 or 10 as hereafter fully explained.

In the actual working of the invention, if the cylindrical blank is truly cylindrical, it is slightly deformed into oval form as shown in Fig. 7 when the opening of the blank is closed by means of the pin joints. As the outer wall of such oval cylinder is turned into true cylinder, the material taken off is greater in parts $h$, $h'$ than in parts $g$, $g'$. Therefore, although the piston rings made of a truly cylindrical blank, exert uniformly distributed pressure against the wall of the engine cylinder, they may be of ununiform thickness. In order to avoid such defect, the cylinder blank is preferably made a somewhat deformed one. Referring to one actual example of such cylindrical blank from which the piston ring is made up for an engine cylinder of 127 mm. inner diameter (see Fig. 8), following deformation is preferable:

$$P = 68.5 \text{ mm.}$$
$$Q = R = 67.0 \text{ mm.}$$
distances between $O_1$ and $O_2$ or $O_1$ and $O_3 = 2.0$ mm.
" " $O_2$ and $O_3 = 3.2$ mm.

Therefore, $D_1$ becomes greater than $D_2$. The original thickness of the blank is 5 mm. in this example which was finished up in 4 mm.

The inventors are well aware of manufacturing piston rings from a cylindrical blank of greater outer diameter by finishing the outer wall thereof into the true cylinder of the smaller or desired diameter and then cutting apart the blank into individual rings. Therefore such steps in the prescribed operation is also by no means the essential of the invention. The essential feature of the invention is to close the opened blank by means of pin joints, that is, by tangential force only acting on the joints. Thus if desired, the blank may be first cut apart into opened rings, each of which is suitably pin jointed as shown in Fig. 9 where the shape of opening wall is of zig-zag in B, or oblique in C; or a shown in Fig. 10 where the shape of the wall is vertically parallel. In the former two examples, the pin hole is not passed through but stopped in partial depth so that the gas leakage therefrom is avoided. In the latter example, two halves of the ring constitute one complete ring and for that purpose, the butt of each half is sufficiently deviated, say 180 degrees, here a pair of pins being used for each butt. A series of any kind of these rings may be assembled on a core drum or any other supporter, suitably clamped together and then turned up to a true circular ring of the desired outer diameter.

Fig. 11 shows a pressure distribution curve K plotted radially along the circumference of a piston ring according to the present invention, while Fig. 12 shows that indicated at K' of a piston ring of usual manufacture and supplied by a certain famous maker, the curves K and K' being obtained by the inventors using a new device for measuring piston ring pressure, also invented by the same inventors. It will be clearly understood that the new piston ring exerts practically equally distributed pressure against the wall of the engine cylinder while the piston ring manufactured by the usual process, exerts very unequal pressure, the value of which greatly varies to the points of the peripherical run. In numerical example, in the former the mean pressure is 0.93 kg. maximum pressure, that is Pmax. 1.26 kg., and minimum pressure, that is, Pmin. 732 kg. each per square cm. That is, the ratio of maximum to minimum is smaller than 2. While in the latter, the mean is 0.982 kg., maximum pressure, that is, Pmax. 2.08 and minimum pressure, that is, Pmin. 0.132, and thus the ratio of maximum to minimum is about 15. In many examples, these ratios are always smaller than 2 in new rings while in the usual rings they lie between 10 to 20.

Briefly, the invention consists of a new idea of closing an opened cylindrical blank or opened ring blank by means of a pin joint or joints only so that the only closing force employed and acting at the joint or joints is the force tangential to the blank. Under such condition the blanks is turned into true cylindrical surface corresponding to that of the inner wall of an engine cylinder, so that although they open when the pin joint or joints is or are released, when employed and closed by the cylindrical wall of the engine cylinder, the condition therein becomes quite the same as when closed by the pin joint or joints so that they exert the possibly uniform pressure against the engine cylinder.

We claim:

1. The method of making piston rings consisting in slitting a substantially cylindrical blank longitudinally and simultaneously forming joints along the edges thus provided, applying fastening means to the blank so as to exert a closing action on the blank tangentially of and across the slit, and finally cutting said blank transeversely at suitable intervals to provide individual rings.

2. In a method as claimed in claim 1, the additional step of turning the blank so as to provide a true cylindrical outer surface of the desired diameter for the individual rings, substantially as and for the purposes set forth.

In testimony whereof we affix our signatures.

MASATOSI OKOCHI.
KEIKICHI EBIHARA